United States Patent
Chen et al.

(10) Patent No.: US 9,451,172 B2
(45) Date of Patent: Sep. 20, 2016

(54) METHOD AND APPARATUS FOR CORRECTING MULTI-EXPOSURE MOTION IMAGE

(71) Applicant: Huawei Technologies Co., Ltd., Shenzhen (CN)

(72) Inventors: Hai Chen, Shenzhen (CN); Meijun Wan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 29 days.

(21) Appl. No.: 14/585,604

(22) Filed: Dec. 30, 2014

(65) Prior Publication Data

US 2015/0116513 A1 Apr. 30, 2015

Related U.S. Application Data

(63) Continuation of application No. PCT/CN2013/070244, filed on Jan. 9, 2013.

(30) Foreign Application Priority Data

Jul. 20, 2012 (CN) .......................... 2012 1 0259363

(51) Int. Cl.
H04N 5/235 (2006.01)
H04N 5/232 (2006.01)
(Continued)

(52) U.S. Cl.
CPC ............. *H04N 5/2352* (2013.01); *G06T 5/007* (2013.01); *G06T 5/50* (2013.01); *H04N 5/23254* (2013.01); *H04N 5/23267* (2013.01); *G06T 2207/10144* (2013.01); *G06T 2207/20208* (2013.01)

(58) Field of Classification Search
None
See application file for complete search history.

(56) References Cited

U.S. PATENT DOCUMENTS

2003/0231348 A1 12/2003 Ishii et al.
2005/0013501 A1 1/2005 Kang et al.
(Continued)

FOREIGN PATENT DOCUMENTS

CN 1577396 A 2/2005
CN 101707666 A 5/2010
(Continued)

OTHER PUBLICATIONS

Foreign Communication From a Counterpart Application, European Application No. 13819945.0, Extended European Search Report dated Aug. 31, 2015, 6 pages.
(Continued)

*Primary Examiner* — Shahbaz Nazrul
(74) *Attorney, Agent, or Firm* — Conley Rose, P.C.; Grant Rodolph; Gayatry S. Nair

(57) ABSTRACT

A method and an apparatus for correcting a multi-exposure motion image are disclosed, where the method includes determining a luminance mapping function, where the luminance mapping function is a luminance mapping relationship between a reference frame and multiple extended frames; mapping a luminance of an extended frame by using the luminance mapping relationship to obtain a virtual frame; calculating a global motion vector between the virtual frame and the reference frame; correcting a pixel of the extended frame according to the global motion vector to obtain a first extended frame after correction; detecting a pixel of the first extended frame according to the reference frame to obtain a local error pixel of the first extended frame; and correcting a luminance of the local error pixel of the first extended frame to obtain a second extended frame after correction.

20 Claims, 6 Drawing Sheets

(51) Int. Cl.
*G06T 5/50* (2006.01)
*G06T 5/00* (2006.01)

(56) References Cited

U.S. PATENT DOCUMENTS

| | | | |
|---|---|---|---|
| 2010/0009119 A1 | 1/2010 | Herron | |
| 2010/0183071 A1 | 7/2010 | Segall et al. | |
| 2010/0271512 A1* | 10/2010 | Garten | G09G 5/06 348/239 |
| 2011/0063460 A1 | 3/2011 | Tokui | |
| 2011/0211732 A1* | 9/2011 | Rapaport | G06F 3/1454 382/107 |
| 2012/0218442 A1* | 8/2012 | Jandhyala | G06T 7/20 348/239 |
| 2013/0314568 A1* | 11/2013 | Vranceanu | H04N 5/2355 348/239 |
| 2016/0019681 A1* | 1/2016 | Cheng | G06T 5/009 348/229.1 |

FOREIGN PATENT DOCUMENTS

| | | |
|---|---|---|
| CN | 102282838 A | 12/2011 |
| CN | 102779334 A | 11/2012 |
| JP | 2012070168 A | 4/2012 |
| WO | 2011042229 A1 | 4/2011 |
| WO | 2011093994 A1 | 8/2011 |
| WO | 2011097060 A2 | 8/2011 |

OTHER PUBLICATIONS

Partial English Translation and Abstract of Chinese Patent Application No. CN102779334A, Part 1, Feb. 26, 2015, 5 pages.
Partial English Translation and Abstract of Chinese Patent Application No. CN102779334A, Part 2, Feb. 26, 2015, 3 pages.
Foreign Communication From a Counterpart Application, Chinese Application No. 201210259363.8, Chinese Office Action dated Mar. 21, 2014, 7 pages.
Foreign Communication From a Counterpart Application, PCT Application No. PCT/CN2013/070244, English Translation of International Search Report dated Apr. 25, 2013, 2 pages.
Foreign Communication From a Counterpart Application, PCT Application No. PCT/CN2013/070244, English Translation of Written Opinion dated Apr. 25, 2013, 12 pages.

\* cited by examiner

METHOD AND APPARATUS FOR CORRECTING MULTI-EXPOSURE MOTION IMAGE

CROSS-REFERENCE TO RELATED APPLICATIONS

This application is a continuation of International Application No. PCT/CN2013/070244, filed on Jan. 9, 2013, which claims priority to Chinese Patent Application No. 201210259363.8, filed on Jul. 20, 2012, both of which are hereby incorporated by reference in their entireties.

TECHNICAL FIELD

The present invention relates to image processing technologies, and in particular, to a method and an apparatus for correcting a multi-exposure motion image.

BACKGROUND

With the development of multi-frame exposure composition high dynamic range (HDR) imaging technologies, in a current consumer market, an HDR photography function is integrated into a smart phone, such as an IPHONE. That is, in a scenario in which a camera stays stable or still, a photography effect is improved to different degrees, and a capability of presenting details in a bright or dark place is improved correspondingly.

However, in a scenario in which a camera shakes or a moving object exists, a poor condition such as a ghost or a blur occurs in an HDR image composited by multi-exposure frames. Frames photographed at different exposure levels significantly differ in luminance.

In the prior art 1, in order to correct an image composited by multi-exposure frames in a motion process, a motion correction method is provided. In this method, mapping is first performed according to a mapping relationship between an exposure frame and a camera response curve, and a luminance of a dark frame is improved; then, a frame-level motion vector is calculated by using a bi-directional prediction method, and correction is performed for the motion vector; finally, local motion is corrected by using a gradient-based optical flow method. However, the method is not only extremely complex but also has an unsatisfactory correction effect because the camera response curve needs to be obtained by using an image sensor and another processing module.

In the prior art 2, a motion correction method is further provided. In this method, a luminance of a first frame is corrected to a luminance range of a second frame by using a luminance mapping function, and then a motion condition between the two frames is detected; and for a motion area, a luminance value of the area which is mapped from the first frame is used to directly replace a pixel value corresponding to the second frame.

However, when a camera moves during photographing, all areas detected by using this method are motion areas, a second frame image corrected by means of replacement has basically lost detail information under the exposure condition, and an effect of a finally composited HDR image is also unsatisfactory. Motion areas determination is relatively difficult, especially for an exposure frame that undergoes luminance mapping, and it is difficult to ensure a result of the motion areas determination due to a different noise level/an over-exposure or under-exposure area. Therefore, a phenomenon of obvious discontinuity in the second frame image after correction likely occurs on an edge of a motion area, which directly affects a final HDR composition effect.

Therefore, in the process of research and practice in the prior art, the inventor of the present invention finds that in an existing implementation manner, no matter in the prior art 1 or in the prior art 2, a multi-exposure frame motion image cannot be effectively corrected in a scenario in which a camera shakes or a moving object exists.

SUMMARY

Embodiments of the present invent provide a method and an apparatus for correcting a multi-exposure motion image, so as to solve a technical problem in the prior art that a multi-exposure frame motion image cannot be effectively corrected.

An embodiment of the present invention provides a method for correcting a multi-exposure motion image, including determining a luminance mapping function, where the luminance mapping function is a luminance mapping relationship between a reference frame and multiple extended frames; mapping a luminance of an extended frame by using the luminance mapping relationship to obtain a virtual frame; calculating a global motion vector between the virtual frame and the reference frame; correcting a pixel of the extended frame according to the global motion vector to obtain a first extended frame after correction; detecting a pixel of the first extended frame according to the reference frame to obtain a local error pixel of the first extended frame; and correcting a luminance of the local error pixel of the first extended frame to obtain a second extended frame after correction.

Correspondingly, an embodiment of the present invention further provides an apparatus for correcting a multi-exposure motion image, including a determining unit configured to determine a luminance mapping function, where the luminance mapping function is a luminance mapping relationship between a reference frame and multiple extended frames; a mapping unit configured to map a luminance of an extended frame by using the luminance mapping relationship to obtain a virtual frame; a first calculating unit configured to calculate a global motion vector between the virtual frame and the reference frame; a first correcting unit configured to correct a pixel of the extended frame according to the global motion vector to obtain a first extended frame after correction; a detecting unit configured to detect a pixel of the first extended frame according to the reference frame to obtain a local error pixel of the first extended frame; and a second correcting unit configured to correct a luminance of the local error pixel of the first extended frame to obtain a second extended frame after correction.

It may be learnt from the forgoing technical solutions that in the embodiments of the present invention, an extended frame is corrected by using a luminance mapping function, correcting global motion, and correcting a local error pixel, so as to solve a technical problem in the prior art that a multi-exposure frame motion image cannot be effectively corrected, that is, in the embodiments, motion between multi-frame exposure images can be effectively corrected, where the motion may include global motion caused by motion of a camera and motion of an object in a scene.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
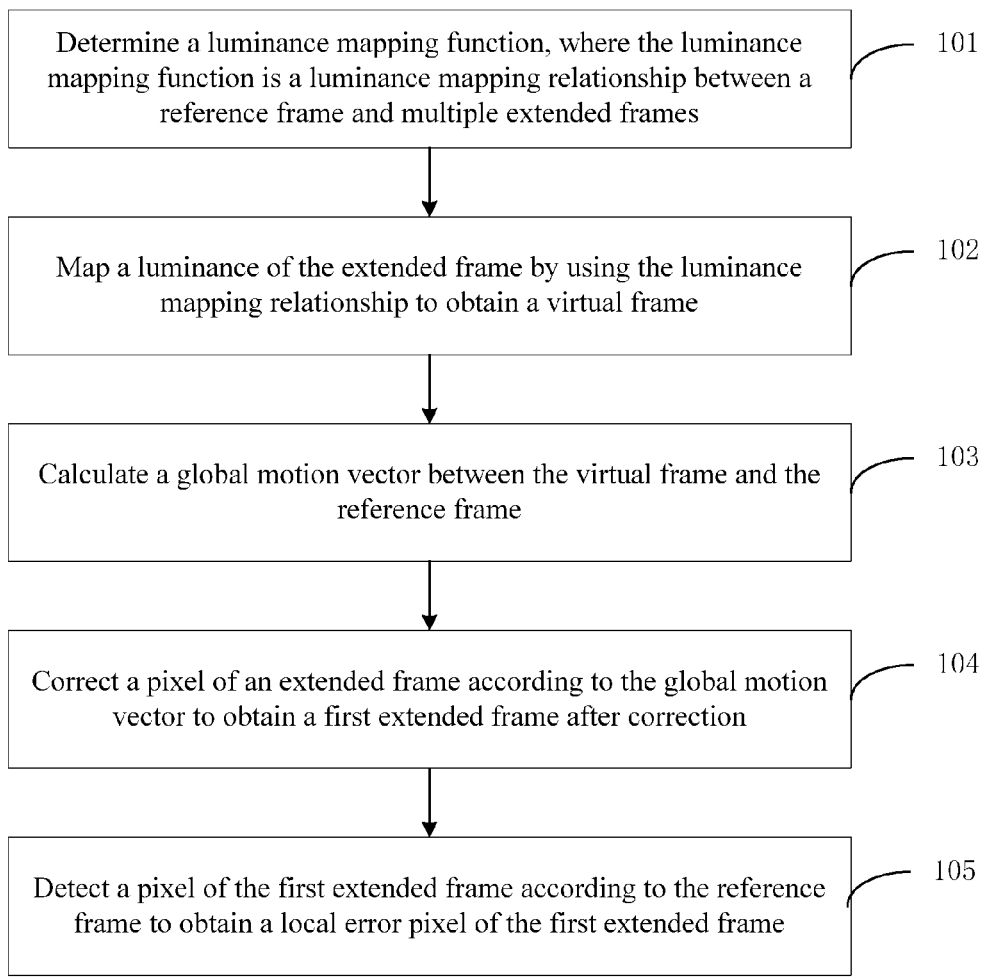
FIG. 1 is a flowchart of a method for correcting a multi-exposure motion image according to an embodiment of the present invention.

Referring to FIG. 1, FIG. 1 is a flowchart of a method for correcting a multi-exposure motion image according to an embodiment of the present invention, where the method includes the following steps.

Step 101: Determine a luminance mapping function, where the luminance mapping function is a luminance mapping relationship between a reference frame and multiple extended frames.

Figure 2:
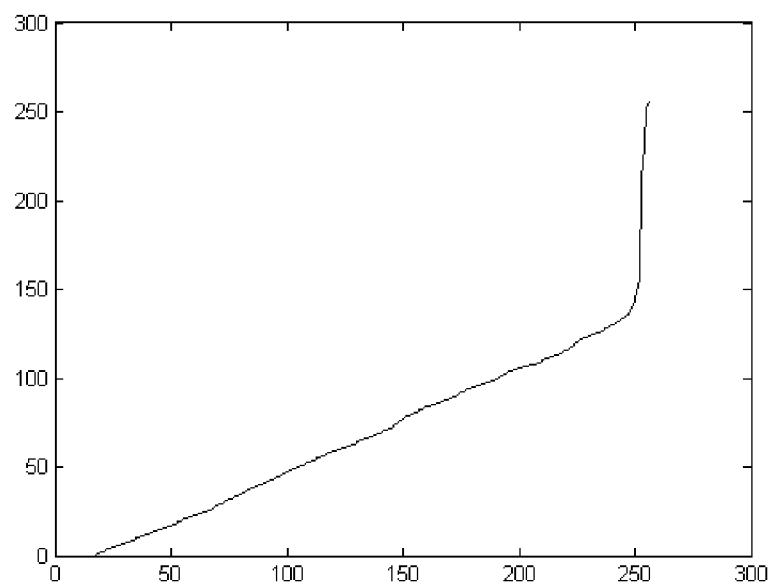
FIG. 2 is a schematic line graph of a luminance mapping function according to an embodiment of the present invention.

In this step, the luminance mapping function F(x) is the luminance mapping relationship between a reference frame and multiple extended frames, where the luminance mapping function may be obtained by calculating a statistical histogram of a reference frame and multiple extended frames, as shown in FIG. 2. FIG. 2 is a schematic line graph of a luminance mapping function according to an embodiment of the present invention. In FIG. 2, a horizontal coordinate represents a luminance of an extended frame image, that is, a luminance of an extended frame, where a large number of over-exposed pixels exist in the extended frame image; and a vertical coordinate represents a luminance of a reference frame image, that is, a luminance of a reference frame.

In addition, in a general case, an exposure value of a camera is determined by an exposure line and a gain; and a multi-frame exposure image refers to an image obtained by a camera by performing photographing at differently configured exposure values. In HDR imaging, images obtained by taking photographs of two or more frames at different exposure values are normally required. In this embodiment, it is defined that an image frame obtained by taking a photograph at a best exposure value in a current scenario is referred to as a reference frame. Frames except the reference frame are referred to as extended frames. For a multi-frame exposure image, a best exposure frame is generally an exposure frame obtained by taking a photograph at an intermediate exposure value.

Step 102: Map a luminance of an extended frame by using the luminance mapping relationship to obtain a virtual frame.

In this step, the luminance mapping function may be used to map the extended frame to obtain a luminance histogram, thereby obtaining a virtual frame similar to the reference frame. That is, except for an over-exposure area, an under-exposure area, and a motion area, a luminance of the virtual frame is extremely close to the luminance of the reference frame.

Step 103: Calculate a global motion vector between the virtual frame and the reference frame.

In this embodiment, the global motion vector between the virtual frame and the reference frame may be calculated in a manner of choosing a reference block. The global motion vector in this embodiment may include a translational motion vector and a rotational motion vector, where a calculation method of the global motion vector is the same as that of an ordinary (e.g., a non-HDR) image. Calculating global translational motion is used as an example in this embodiment, which includes the following.

First, a reference frame image is divided into fixed-size image sub-blocks (for example, 64×64). A mean luminance and a standard deviation of each sub-block are collected by means of statistics, and an image sub-block which has an excessively dark or bright mean luminance or has an excessively small standard deviation (that is, a flat area) is removed. From remaining image sub-blocks, a specified quantity (for example 9) of image sub-blocks are chosen as reference blocks. Locations of reference blocks (i0, j0), . . . , and (i9, j9) are recorded, and these reference blocks are evenly distributed in locations of an image.

Then, according to the following block matching formula, a translational vector is calculated by using the reference blocks, where the formula is as follows:

$$\min_{mx\in[-tx,tx], my\in[-ty,ty]} \{\Sigma_{k=0}^{9} \|\text{ref}(ik,jk), \text{ext}(ik+mx, jk+my)\|\}$$

where tx, ty indicates a maximum range of image motion; (mx, my) is a possible motion vector; ref(ik, jk) refers to the $k^{th}$ reference block in a reference frame; ext(ik+mx, jk+my) is the $k^{th}$ reference block which is offset by mx, my in the virtual frame; and ‖ref(ik, jk), ext(ik+mx, jk+my)‖ is the Euclidean distance between two image blocks, that is, the sum of absolute differences of corresponding points of the two image blocks.

Finally, mx, my corresponding to the minimum differences is a global motion vector.

A specific process of calculating global translational motion is a well-known technology to a person skilled in the art, and details are not repeatedly described herein.

In addition, in this embodiment, in a case in which a relatively high real-time requirement is imposed, only global translational motion may be calculated, or both global translational motion and rotational motion may be calculated. For the former case, an error caused by the rotational motion may be left to be corrected together with a subsequent local error pixel. Certainly, the global translational motion and rotational motion may also be calculated, where a global translational motion vector is obtained by calculating the global translational motion, and a global rotational motion vector is obtained by calculating the rotational motion.

Step 104: Correct a pixel of the extended frame according to the global motion vector to obtain a first extended frame after correction.

In this embodiment, if only reference frame correction for translational motion is considered during correction, most of pixel correction may be completed in a simple pointer offset manner. If translational motion amount of a virtual frame relative to the reference frame is (a, b), that is, a pixel of coordinate (0, 0) in the reference frame corresponds to (a, b) in the virtual frame, where width and height of the image is (w, h), and a memory pointer of an original extended frame luminance is p, and a pointer obtained after correction is p+b*w+a. An offset virtual frame causes a "vacant" pixel around the image. For correction on the "vacant" pixel, a method of supplementing a closest pixel may be used; alternatively, a pixel in a corresponding location in the reference frame may be obtained by means of mapping according to the luminance mapping function. This is a known technology to a person skilled in the art, and details are not repeatedly described herein.

Certainly, if reference frame correction for both translational motion and rotational motion is considered, the pixel of the extended frame may be corrected in an interpolation manner, so as to obtain a first extended frame after correction, that is, a virtual frame after correction is obtained by using an interpolation method. For a vacant pixel, a supplementing method in which "only translational motion is considered" may be adopted. For details, refer to the foregoing description, and detail are not repeatedly described herein.

Step 105: Detect a pixel of the first extended frame according to the reference frame to obtain a local error pixel of the first extended frame.

After correction in the foregoing step is performed, pixels which are not corresponding to each other between the extended frame after global motion correction and the reference frame are greatly reduced, but a small quantity of asymmetric pixels still exist, which is mainly caused in the following several situations: 1. inaccurate calculation of global motion; 2. a rotational case not considered during global motion; 3. a motion parallax formed due to a different scene depth; 4. local motion and a motion blur of an object in a scene; and 5. an expanding outline of an over-exposure area in a long-time exposed image. In this embodiment, these pixels which are not corresponding to each other are collectively referred to as local error pixels whose common characteristic is as follows. A difference between a mapping value, which is obtained by means of mapping by performing an inverse function of a luminance mapping function on a pixel of a reference frame, and a pixel value corresponding to the extended frame goes beyond a proper range.

Correct a luminance of the local error pixel of the first extended frame to obtain a second extended frame after correction.

Figure 3:
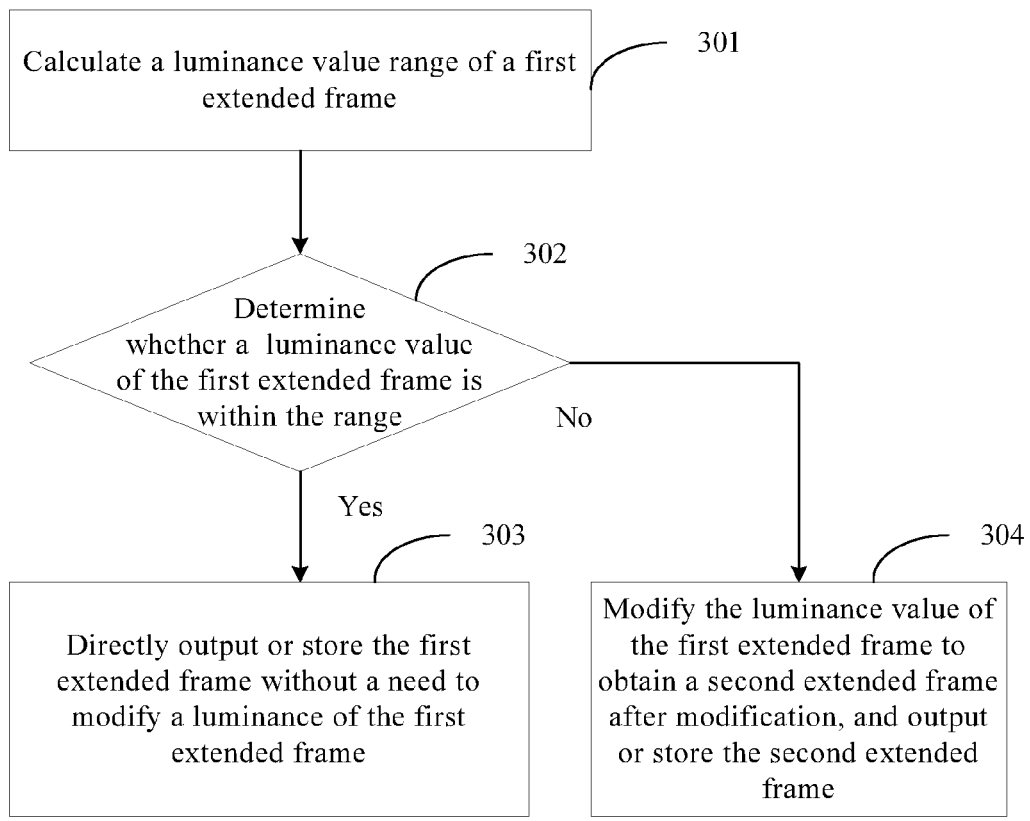
FIG. 3 is a flowchart of a method for correcting a local error pixel according to an embodiment of the present invention.

In this step, a method for correcting a local error pixel is provided, and a flowchart of the method for correcting a local error pixel is shown in FIG. 3, to which the method is not limited. The method includes the following steps.

Step 301: Calculate a luminance value range of the first extended frame.

One calculation method is to use an inverse function of the luminance mapping function to obtain a luminance value x of a pixel location of the first extended frame; map the luminance value x to obtain an expected value fx; and determine that the luminance value range of the first extended frame is [fx−ix, fx+ax] according to the luminance value x, the expected value fx, and an exposure relationship between the extended frame and the reference frame, where the ix and ax are fixed limit constants. However, this embodiment is not limited to this calculation manner, and another similar calculation manner may be used, which is not limited in this embodiment.

Step 302: Determine whether a luminance value of the first extended frame is within the range; if the luminance value of the first extended frame is within the range, perform step 303; and if the luminance value of the first extended frame is not within the range, perform step 304.

Step 303: Directly output or store the first extended frame without a need to modify a luminance of the first extended frame.

Step 304: Modify the luminance value of the first extended frame to obtain a second extended frame after modification, and output or store the second extended frame.

That is, the inverse function of the luminance mapping function is used to obtain a luminance value x (for example, 160) of the pixel location of the first extended frame, the luminance value x is mapped to obtain an expected value fx (for example, 90), and then a proper range [fx−ix, fx+ax], for example [82, 106], is estimated according to the exposure relationship between the extended frame and the reference frame, where ix and ax may also be fixed limit constants, for example, 16, which is a minor change threshold that can be perceived by human eyes. If a luminance value (for example, 60) of a corresponding pixel location of the extended frame does not belong to a pixel within the proper range, the corresponding pixel is a local error pixel. A specific method for correcting the local error pixel may be to replace the luminance value (for example, 60) with a simple expected value fx (for example, 90), or replace the luminance value (for example, 60) with a minimum value (for example, 82) of absolute difference values between all values within the proper range and x.

Optionally, in this embodiment, to make an extended frame (for example, the first extended frame) before and after correction relatively smooth, the following formula may also be used to modify a luminance value of the extended frame, and the formula is:

$$x' = a * Thr + (1 - a) * x$$
$$a = \min(1, |Thr - x|/\beta)$$
$$Thr = \begin{cases} fx - ix & \text{when } x < fx - ix \\ fx + ax & \text{when } x > fx + ax \end{cases},$$

where the a is a weighting coefficient obtained by means of calculation, the x is a luminance value, the fx is an expected value, the Thr is a closest expected value, and β is a smooth control coefficient, which may be assigned 8, 16, 32, or the like for ease of calculation. This is a well-known technology to a person skilled in the art, and details are not repeatedly described herein.

In another embodiment of the present invention, in a case in which a relatively high requirement on a correction effect is imposed, both global translational motion and rotational motion may be calculated, and then a virtual frame after correction is obtained by using an interpolation method. For a vacant pixel after correction, a supplementing method in which "only translational motion is considered" may be adopted for correction. The embodiment of the present invention provides a fast electronic image stabilization algorithm for compensating translational motion and rotational motion, where the algorithm is to first estimate and compensate translational motion between video image sequences by using a gray scale projection algorithm, choose several small blocks with an obvious characteristic from an edge area close to an image edge by using Laplace transform, perform matching by using a block matching algorithm, and calculate and compensate an amount of rotational motion thereof, so as to obtain stable video image sequences. By means of theoretical analysis and experimental verification, it is indicated that the image stabilization algorithm features a high speed and high accuracy. The specific implementing process thereof is a technology well-known to a person skilled in the art, and details are not repeatedly described herein.

In this embodiment of the present invention, an extended frame is corrected by using a luminance mapping function, correcting global motion, and correcting a local error pixel, so as to solve a technical problem in the prior art that a multi-exposure frame motion image cannot be effectively corrected, that is, motion between multi-frame exposure images can be effectively corrected in this embodiment, where the motion may include global motion caused by motion of a camera and motion of an object in a scene. Further, in this embodiment, an image frame after correction can be smoothly transitioned at a boundary of a motion area without a need to calibrate a camera in advance.

Figure 4:
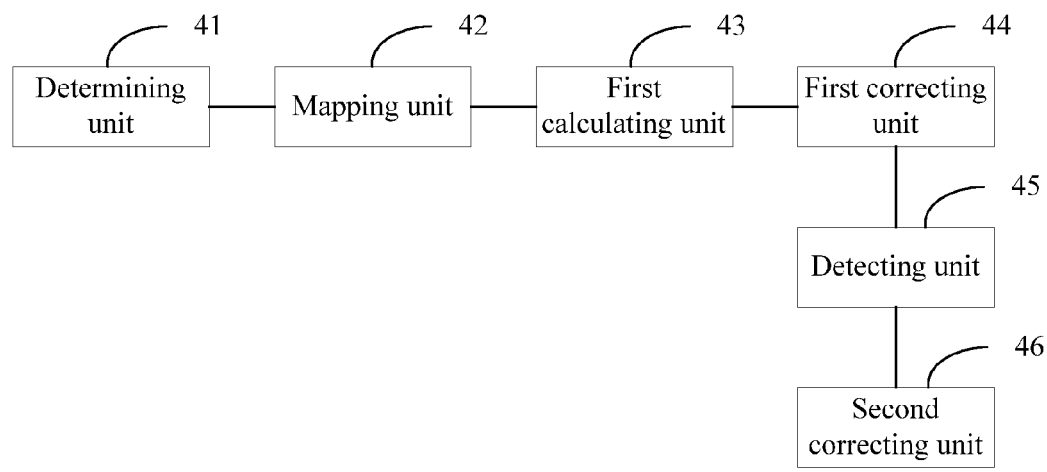
FIG. 4 is a schematic structural diagram of an apparatus for correcting a multi-exposure motion image according to an embodiment of the present invention.

Based on the implementing process of the foregoing method, an embodiment of the present invention further provides an apparatus for correcting a multi-exposure motion image, and a schematic structural diagram of the apparatus is shown in FIG. 4. The correcting apparatus includes a determining unit 41, a mapping unit 42, a first calculating unit 43, a first correcting unit 44, a detecting unit 45, and a second correcting unit 46, where the determining unit 41 is configured to determine a luminance mapping function, where the luminance mapping function is a luminance mapping relationship between a reference frame and multiple extended frames; the mapping unit 42 is configured to map a luminance of an extended frame by using the luminance mapping relationship to obtain a virtual frame; the first calculating unit 43 is configured to calculate a global motion vector between the virtual frame and the reference frame; the first correcting unit 44 is configured to correct a pixel of the extended frame according to the global motion vector to obtain a first extended frame after correction; the detecting unit 45 is configured to detect a pixel of the first extended frame according to the reference frame to obtain a local error pixel of the first extended frame; and the second correcting unit 46 is configured to correct a luminance of the local error pixel of the first extended frame to obtain a second extended frame after correction.

Figure 5:
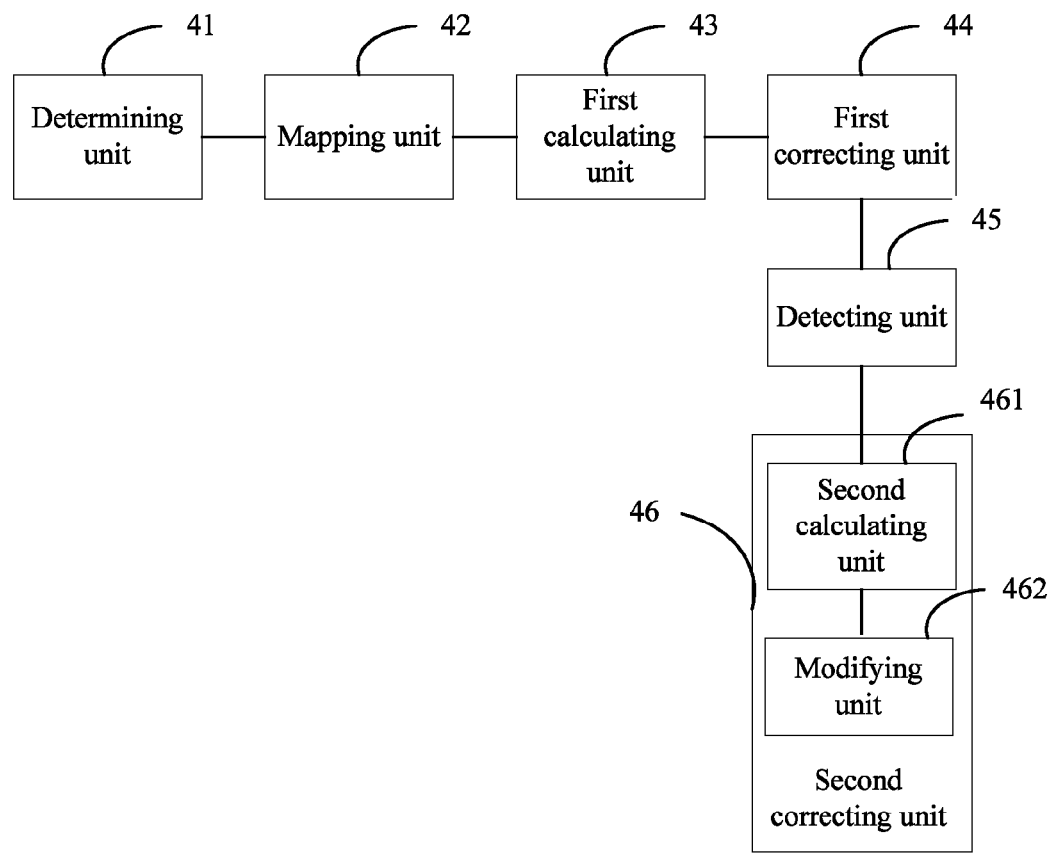
FIG. 5 is a second schematic structural diagram of an apparatus for correcting a multi-exposure motion image according to an embodiment of the present invention.

The second correcting unit 46 includes a second calculating unit 461 and a modifying unit 462, where the second calculating unit 461 is configured to calculate a luminance value range of the first extended frame; and the modifying unit 462 is configured to, when a luminance value of the first extended frame is not within the range, modify the luminance value of the first extended frame to obtain a second extended frame after modification. A schematic structural diagram of the apparatus is shown in FIG. 5. FIG. 5 is a second schematic structural diagram of an apparatus for correcting a multi-exposure motion image according to an embodiment of the present invention.

Figure 6:
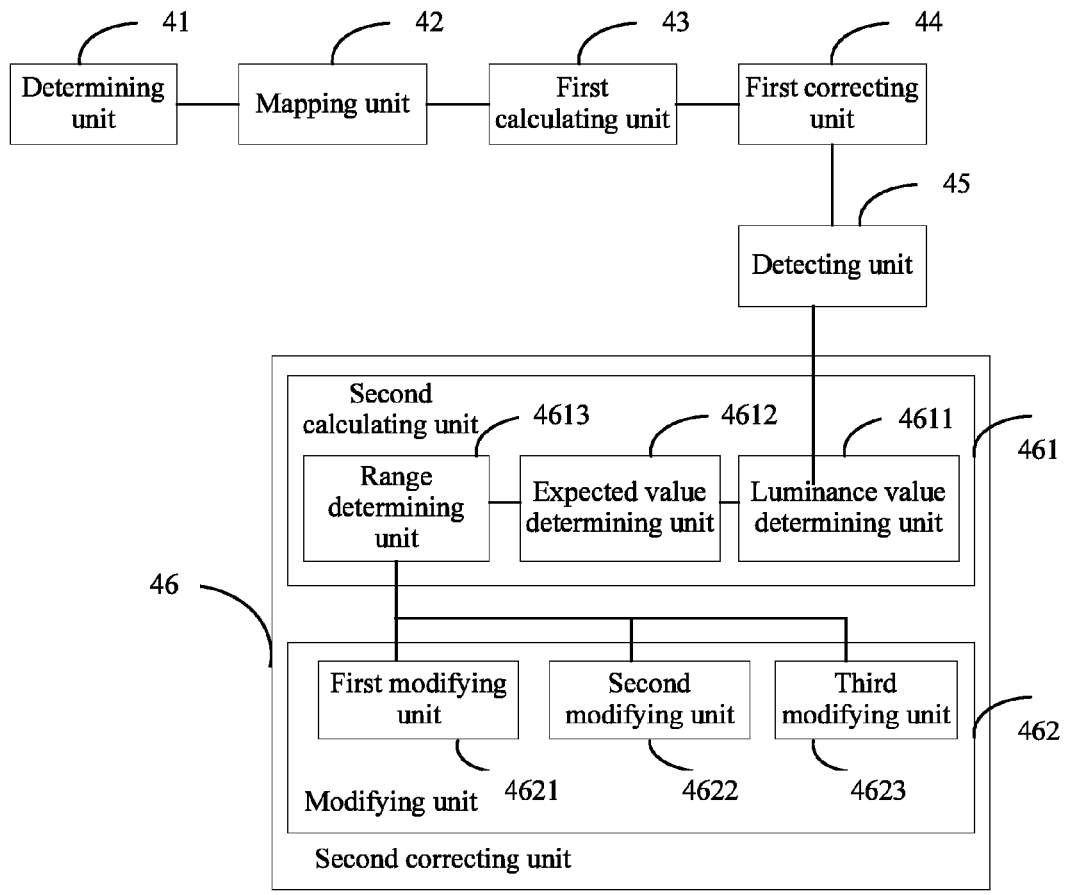
FIG. 6 is a third schematic structural diagram of an apparatus for correcting a multi-exposure motion image according to an embodiment of the present invention.

Further referring to FIG. 6, FIG. 6 is a third schematic structural diagram of an apparatus for correcting a multi-exposure motion image according to an embodiment of the present invention. This embodiment is based on the embodiment described in FIG. 5.

The second calculating unit 461 includes a luminance value determining unit 4611, an expected value determining unit 4612, and a range determining unit 4613. The luminance determining unit 4611 is configured to obtain a luminance value x of a pixel location of the first extended frame by using an inverse function of the luminance mapping function; the expected value determining unit 4612 is configured to map the luminance value to obtain an expected value fx; and the range determining unit 4613 is configured to determine that the luminance value range of the first extended frame is [fx−ix, fx+ax] according to the luminance value x, the expected value fx, and an exposure relationship between the extended frame and the reference frame, where ix and ax are fixed limit constants.

The modifying unit 462 includes a first modifying unit 4621, a second modifying unit 4622, and/or a third modifying unit 4623, where the first modifying unit 4621 is configured to modify the luminance value of the first extended frame as the expected value fx; the second modifying unit 4622 is configured to modify the luminance value of the first extended frame as a minimum value of absolute difference values between all values within the range [fx−ix, fx+ax] and the luminance value x; and the third modifying unit 4623 is configured to modify the luminance value of the first extended frame according to a formula, where the formula is:

$$x' = a * Thr + (1-a) * x$$
$$a = \min(1, |Thr - x|/\beta)$$
$$Thr = \begin{cases} fx - ix \text{ when } x < fx - ix \\ fx + ax \text{ when } x > fx + ax \end{cases},$$

where the a is a weighting coefficient obtained by means of calculation, the Thr is a closest expected value, β is a smooth control coefficient, the x is a luminance value, the fx is an expected value, and the ix and ax are fixed limit constants.

In this embodiment, that the modifying unit includes the first modifying unit, the second modifying unit, and the third modifying unit is used as an example, to which this embodiment is not limited.

For details of implementing processes of functions and roles of each unit in the apparatus, refer to the corresponding implementing processes in the foregoing method, and details are not repeated herein.

It should be noted that in this specification, relational terms such as first and second are merely used to distinguish an entity or operation from another entity or operation, and do not require or imply that any actual relationship or sequence exists between these entities or operations. Furthermore, the terms "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

Based on the foregoing descriptions of the embodiments, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a read-only memory (ROM)/random-access memory (RAM), a magnetic disk, or an optical disc, and includes several instructions for instructing a calculator device (which may be a personal computer, a server, a network device, or the like) to perform the methods described in the embodiments of the present invention.

The foregoing descriptions are merely exemplary implementation manners of the present invention. It should be noted that a person of ordinary skill in the art may make certain improvements or polishing without departing from the principle of the present invention and the improvements or polishing shall fall within the protection scope of the present invention.

What is claimed is:

1. A method for correcting a multi-exposure motion image, comprising:
    mapping a luminance of an extended frame using a luminance mapping relationship between a reference frame and multiple extended frames to obtain a virtual frame;
    calculating a global motion vector between the virtual frame and the reference frame;
    correcting a pixel of the extended frame in a pointer offset manner to obtain a first extended frame after correction when the global motion vector comprises a translational motion vector;
    correcting the pixel of the extended frame in an interpolation manner to obtain the first extended frame after correction when the global motion vector comprises the translational motion vector and a rotational motion vector;
    detecting a pixel of the first extended frame according to the reference frame to obtain a local error pixel of the first extended frame; and
    correcting a luminance of the local error pixel of the first extended frame to obtain a second extended frame after correction.

2. A method for correcting a multi-exposure motion image, comprising:
    mapping a luminance of an extended frame using a function, indicating relationship between a reference frame and multiple extended frames to obtain a virtual frame;
    calculating a global motion vector between the virtual frame and the reference frame;
    correcting a pixel of the extended frame according to the global motion vector to obtain a first extended frame after correction;
    detecting a pixel of the first extended frame according to the reference frame to obtain a local error pixel of the first extended frame;
    calculating a luminance value range of the first extended frame; and
    modifying a luminance value of the first extended frame to obtain a second extended frame after modification when the luminance value of the first extended frame is not within the luminance value range.

3. The method according to claim 2, wherein correcting the luminance of the local error pixel of the first extended frame to obtain the second extended frame after luminance correction further comprises skipping modifying the luminance value of the first extended frame when the luminance value of the first extended frame is within the luminance value range.

4. The method according to claim 2, wherein calculating the luminance value range of the first extended frame comprises:
    obtaining a luminance value x of a pixel location of the first extended frame by using an inverse function of the luminance mapping function;
    mapping the luminance value x to obtain an expected value fx; and
    determining that the luminance value range of the first extended frame is [fx−ix, fx+ax] according to the luminance value x, the expected value fx, and an exposure relationship between the extended frame and the reference frame, wherein ix and ax are fixed limit constants.

5. The method according to claim 4, wherein modifying the luminance value of the first extended frame to obtain the second extended frame after modification comprises modifying the luminance value of the first extended frame as the expected value fx.

6. The method according to claim 4, wherein modifying the luminance value of the first extended frame to obtain the second extended frame after modification comprises modifying the luminance value of the first extended frame as a minimum value of absolute difference values between all values within the range [fx−ix,fx+ax] and the luminance value x.

7. The method according to claim 4, wherein modifying the luminance value of the first extended frame to obtain the second extended frame after modification comprises modifying the luminance value of the first extended frame according to the following formula:

$$x' = a * Thr + (1-a) * x$$

$$a = \min(1, |Thr - x|/\beta)$$

$$Thr = \begin{cases} fx - ix & \text{when } x < fx - ix \\ fx + ax & \text{when } x > fx + ax \end{cases},$$

wherein the a is a weighting coefficient obtained by means of calculation, Thr is a closest expected value, $\beta$ is a smooth control coefficient, x is a luminance value, and fx is an expected value, and ix and ax are fixed limit constants.

8. An apparatus for correcting a multi-exposure motion image, comprising:
    a memory configured to store an instruction; and
    a processor configured to execute the instruction stored in the memory so as to:
        map a luminance of an extended frame using a function, indicating relationship between a reference frame and multiple extended frames to obtain a virtual frame;
        calculate a global motion vector between the virtual frame and the reference frame;
        correct a pixel of the extended frame according to the global motion vector to obtain a first extended frame after correction;
        detect a pixel of the first extended frame according to the reference frame to obtain a local error pixel of the first extended frame;
        calculate a luminance value range of the first extended frame; and modify a luminance value of the first extended frame to obtain a second extended frame after modification when the luminance value of the first extended frame is not with the luminance value range.

9. The apparatus according to claim 8, wherein the processor is further configured to execute the instruction stored in the memory so as to:
   obtain a luminance value x of a pixel location of the first extended frame by using an inverse function of the luminance mapping function;
   map the luminance value x to obtain an expected value fx; and
   determine that the luminance value range of the first extended frame is [fx−ix, fx+ax] according to the luminance value x, the expected value fx, and an exposure relationship between the extended frame and the reference frame, wherein ix and ax are fixed limit constants.

10. The apparatus according to claim 9, wherein the processor is further configured to execute the instruction stored in the memory so as to modify the luminance value of the first extended frame as the expected value fx.

11. The apparatus according to claim 9, wherein the processor is further configured to execute the instruction stored in the memory so as to modify the luminance value of the first extended frame as a minimum value of absolute difference values between all values within the range [fx−ix, fx+ax] and the luminance value x.

12. The apparatus according to claim 9, wherein the processor is further configured to execute the instruction in the memory so as to modify the luminance value of the first extended frame according to a formula, wherein the formula is:

$$x' = a * Thr + (1-a) * x$$
$$a = \min(1, |Thr - x|/\beta)$$
$$Thr = \begin{cases} fx - ix & \text{when } x < fx - ix \\ fx + ax & \text{when } x > fx + ax \end{cases},$$

wherein the a is a weighting coefficient obtained by means of calculation, Thr is a closest expected value, β is a smooth control coefficient, the x is a luminance value, fx is an expected value, and ix and ax are fixed limit constants.

13. The method according to claim 1, further comprising calculating a luminance value range of the first extended frame.

14. The method according to claim 1, further comprising modifying a luminance value of the first extended frame to obtain a second extended frame when the luminance value of the first extended frame is not within a luminance value range of the first extended frame.

15. The method according to claim 14, further comprising skipping modifying the luminance value of the first extended frame to obtain the second extended frame when the luminance value of the first extended frame is within the luminance value range.

16. The method according to claim 1, further comprising obtaining a luminance value x of a pixel location of the first extended frame using an inverse function of the luminance mapping function.

17. The method according to claim 16, further comprising mapping the luminance value x to obtain an expected value fx.

18. The method according to claim 17, determining that a luminance value range of the first extended frame is [fx−ix, fx+ax] according to the luminance value x, the expected value fx, and an exposure relationship between the extended frame and the reference frame, wherein ix and ax are fixed limit constants.

19. The method according to claim 17, further comprising modifying the luminance value of the first extended frame as the expected value fx.

20. An apparatus for correcting a multi-exposure motion image, comprising:
   a memory configured to store an instruction; and
   a processor configured to execute the instruction stored in the memory so as to:
      map a luminance of an extended frame by using a luminance mapping relationship between a reference frame and multiple extended frames to obtain a virtual frame;
      calculate a global motion vector between the virtual frame and the reference frame;
      correct a pixel of the extended frame in a pointer offset manner to obtain a first extended frame after correction when the global motion vector comprises a translational motion vector;
      correct the pixel of the extended frame in an interpolation manner to obtain the first extended frame after correction when the global motion vector comprises the translational motion vector and a rotational motion vector;
      detect a pixel of the first extended frame according to the reference frame to obtain a local error pixel of the first extended frame; and
      correct a luminance of the local error pixel of the first extended frame to obtain a second extended frame after correction.

* * * * *

UNITED STATES PATENT AND TRADEMARK OFFICE
CERTIFICATE OF CORRECTION

PATENT NO. : 9,451,172 B2
APPLICATION NO. : 14/585604
DATED : September 20, 2016
INVENTOR(S) : Chen et al.

It is certified that error appears in the above-identified patent and that said Letters Patent is hereby corrected as shown below:

In the Claims

Column 8, Line 47, Claim 2 should read:

A method for correcting a multi-exposure motion image, comprising:
mapping a luminance of an extended frame using a luminance mapping function, indicating relationship between a reference frame and multiple extended frames to obtain a virtual frame;
calculating a global motion vector between the virtual frame and the reference frame;
correcting a pixel of the extended frame according to the global motion vector to obtain a first extended frame after correction;
detecting a pixel of the first extended frame according to the reference frame to obtain a local error pixel of the first extended frame;
calculating a luminance value range of the first extended frame; and
modifying a luminance value of the first extended frame to obtain a second extended frame after modification when the luminance value of the first extended frame is not within the luminance value range.

Column 10, Line 54, Claim 8 should read:

An apparatus for correcting a multi-exposure motion image, comprising:
a memory configured to store an instruction; and
a processor configured to execute the instruction stored in the memory so as to:
map a luminance of an extended frame using a luminance mapping function, indicating relationship between a reference frame and multiple extended frames to obtain a virtual frame;
calculate a global motion vector between the virtual frame and the reference frame;
correct a pixel of the extended frame according to the global motion vector to obtain a first extended frame after correction;
detect a pixel of the first extended frame according to the reference frame to obtain a local error pixel of the first extended frame;

Signed and Sealed this
Tenth Day of January, 2017

Michelle K. Lee
*Director of the United States Patent and Trademark Office* calculate a luminance value range of the first extended frame; and
modify a luminance value of the first extended frame to obtain a second extended frame after modification when the luminance value of the first extended frame is not with the luminance value range.

Column 11, Line 30, Claim 12 should read:

The apparatus according to claim 11, wherein the processor is further configured to execute the instruction stored in the memory so as to modify the luminance value of the first extended frame according to a formula, wherein the formula is:

$$x' = a * Thr + (1-a) * x \quad a = \min(1, |Thr - x|/\beta) \quad Thr = \begin{cases} fx - ix & \text{when } x < fx - ix \\ fx + ax & \text{when } x > fx + ax \end{cases},$$

wherein the a is a weighting coefficient obtained by means of calculation, Thr is a closest expected value, β is a smooth control coefficient, the x is a luminance value, fx is an expected value, and ix and ax are fixed limit constants.